United States Patent [19]

Fitzgerald

[11] Patent Number: 4,865,540

[45] Date of Patent: Sep. 12, 1989

[54] AIR FLOW MEASUREMENT DEVICE FOR FLUIDIZED BED REACTOR

[75] Inventor: Francis D. Fitzgerald, Phillipsburg, N.J.

[73] Assignee: Foster Wheeler Energy Corporation, Clinton, N.J.

[21] Appl. No.: 304,998

[22] Filed: Feb. 1, 1989

[51] Int. Cl.$^4$ ............................................. F23N 1/02
[52] U.S. Cl. .................................... 431/89; 431/170; 431/7
[58] Field of Search .................. 431/7, 38, 89, 170, 431/328; 422/139, 143; 432/14, 58; 110/243, 245

[56] References Cited

U.S. PATENT DOCUMENTS 4,499,832   2/1985   McNeil .................. 431/170 XR

FOREIGN PATENT DOCUMENTS 207809   10/1985   Japan .................. 431/170

*Primary Examiner*—Randall L. Green
*Attorney, Agent, or Firm*—Marvin A. Naigur; Warren B. Kice

[57] ABSTRACT

A fluidized bed reactor in which an air distribution plate is disposed within an enclosure for supporting a bed of particulate material including fuel. The air distribution plate includes a plurality of vertically disposed nozzles extending therethrough for receiving air from an air plenum and discharging the air in an upward direction into the bed at a velocity sufficient to fluidize the bed material and support the combustion or gasification of the fuel. A first pressure sensing device is disposed within at least one of said nozzles and a second pressure sensing device is disposed within the air plenum, whereby the rate of air flow into the bed of particulate material can be measured.

16 Claims, 1 Drawing Sheet

1

AIR FLOW MEASUREMENT DEVICE FOR FLUIDIZED BED REACTOR

BACKGROUND OF THE INVENTION

This invention relates to a fluidized bed reactor, and, more particularly, to such a reactor in which the rate of air flow to the fluidized bed of the reactor is measured.

Fluidized bed reactors, including steam generators, combustors and gasifiers, are well known. In these arrangements, air is passed through a perforated plate, or the like, which supports a bed of particulate material, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxides emissions and fuel flexibility.

The most typical fluidized bed combustion system is commonly referred to as a bubbling fluidized bed in which a bed of particulate material is supported by an air distribution plate. Combustion-supporting air is introduced to the bed of particulate material through a plurality of perforations in the plate, causing the material to expand and take on a suspended or fluidized state. In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn down afforded by the bubbling bed, a fluidized bed reactor has been developed utilizing a fast, or circulating, fluidized bed. According to this technique, fluidized bed densities between 5% and 20% volume of solids are attained which is well below the 30% volume of solids typical of the bubbling fluidized bed. The formation of the low density circulating fluidized bed is due to its small particle size and to a high solids throughput, which requires high solids recycle. The velocity range of a circulating fluidized bed is between the solids terminal, or free fall, velocity and a velocity which is a function of the throughput, beyond which the bed would be converted into a pneumatic transport line.

The high solids circulation required by the circulating fluidized bed makes it insensitive to fuel heat release patterns, thus minimizing the variation of the temperature within the combustor or gasifier, and therefore decreasing the nitrogen oxides formation. Also, the high solids loading improves the efficiency of the mechanical device used to separate the gas from the solids for solids recycle. The resulting increase in sulfur adsorbent and fuel residence times reduces the adsorbent and fuel consumption. Furthermore, the circulating fluidized bed inherently has more turndown than the bubbling fluidized bed.

In both a bubbling fluidized bed reactor and a circulating fluidized bed reactor, the bed of particulate material is supported by an air distribution plate. An air plenum is located below the air distribution plate and the plenum receives air from a circulation device such as a fan. The combustion supporting air is passed from the air plenum through openings or perforations in the air distribution plate to fluidize the particulate material. is important that the air flow to the bed of particulate material be measured to ensure that the flow of air to the bed is sufficient to maintain the fluidized state of the bed and, in the case of a circulating fluidized bed, to ensure the bed is not converted to a pneumatic transport line. The conventional methods of measuring air flow to the bed of particulate material, however, present many disadvantages and drawbacks. For example, a first conventional method requires placing an orifice plate or venturi in a long section of ducting between the fan and the plenum, negating the possibility of a compact reactor design, while a second conventional method requires the utilization of a hot wire anemometer or a honeycomb device which greatly adds to the capital expense and operating costs of the reactor.

SUMMARY OF THE INVENTION

It is therefore an object of the present invention to provide a fluidized bed reactor which is relatively compact in size.

It is a further object of the present invention to provide a reactor of the above type in which the rate of air flow into the bed of particulate material of the reactor is accurately measured.

It is a still further object of the present invention to provide a reactor of the above type in which the rate of air flow into the bed of particulate material is measured by determining the differential between the pressure in a plenum supplying air to the bed and the pressure within a nozzle distributing air to the bed from the plenum.

It is a still further object of the present invention to provide a reactor of the above type in which an orifice plate is located at the inlet of a nozzle and the pressure within the nozzle is measured through a hole tapped in the nozzle downstream of the orifice plate.

It is a still further object of the present invention to provide a reactor of the above type in which a bell mouth venturi block is located at the inlet of a nozzle and the pressure within the venturi is measured through a hole tapped in the throat of the venturi block.

It is a still further object of the present invention to provide a reactor of the above type in which the pressure within a nozzle is measured through a hole tapped in the nozzle at a point that is at least five times the diameter of the nozzle downstream of the nozzle inlet.

It is still further object of the present invention to provide a reactor of the above type in which pressure is measured within a statistically significant number of nozzles.

It is a still further object of the present invention to provide a reactor of the above type in which the rate of air flow into the bed of particulate material is obtained in an efficient manner requiring no additional duct work and a minimum of duct space.

Toward the fulfillment of these and other objects, the fluidized bed reactor of the present invention includes an air distribution plate adapted to support a bed of particulate material including fuel. A plurality of nozzles extend through the plate for receiving air from an air plenum and discharging the air in an upward direction into the bed at a velocity sufficient to fluidize the bed material and support the combustion or gasification of said fuel. A pressure sensing unit is disposed within at least one of the nozzles and within the air plenum whereby the rate of air flow into the bed of particulate material can be determined from the difference in pressure between the nozzle and the air plenum.

BRIEF DESCRIPTION OF THE DRAWINGS

The above brief description as well as further objects, features and advantages of the reactor of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENTS

Figure 1:
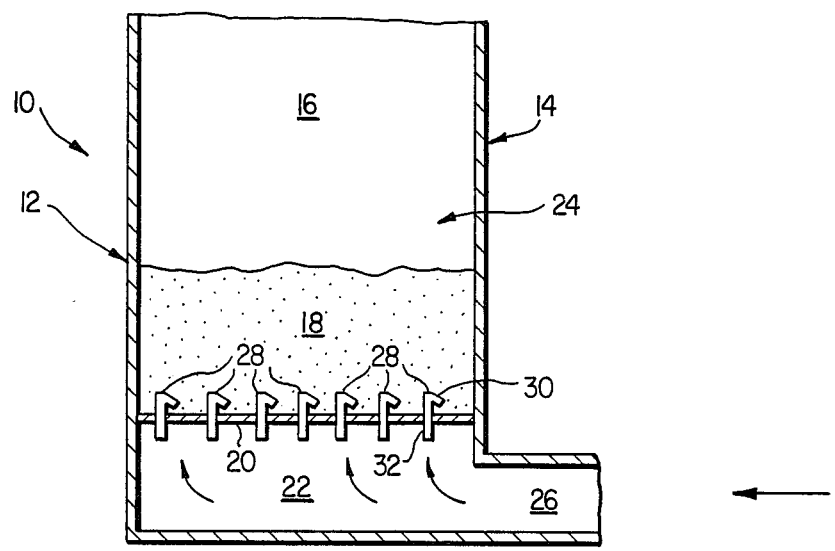
Fig. 1 is a vertical sectional view depicting the fluidized bed reactor of the present invention.

Referring to Fig. 1 of the drawings, the reference numeral 10 refers in general to an enclosure forming a major portion of a fluidized bed heat exchanger, or reactor, which may be in the form of a boiler, combustor, or any similar type device. The enclosure 10 consists of a front wall 12, a rear wall 14, and two sidewalls, one of which is shown by the reference numeral 16. The upper portion of the enclosure 10 is not shown for the convenience of presentation it being understood that it consists of a convection section, a roof and an outlet for allowing the combustion gases to discharge, also in a conventional manner.

A bed of particulate material, shown in general by the reference numeral 18, is disposed within the enclosure 10 and rests on a perforated air distribution plate 20 which divides the enclosure 10 into an air plenum chamber 22 and a furnace section 24. An air inlet 26 is provided through the lower portion of rear wall 14 in communication with the air plenum chamber 22 for distributing air from an external source (not shown) to the chamber. Suitable air flow regulators (not shown) can be mounted in the inlet 26 to vary the effective opening in the inlet 26 and thus control the flow of air into the chamber 22. Since the air flow regulators are of a conventional design and well known to those skilled in the art, they will not be described in an further detail.

As noted above, the perforated air distribution plate 20 is adapted to support a bed 18 of particulate material consisting of inert material, a solid fuel material such as coal, and a sorbent material for the sulfur formed during combustion of the fuel if the fuel contains relatively large amounts of sulfur. In cases where sulphur removal is not required, as in municipal solid waste combustors, inert sand may be utilized in lieu of the sorbent. The overall apparatus shown in Fig. 1 may, as an illustrative example, be incorporated into an appropriate heat transfer device wherein the heat produced by the bed which is fluidized during the combustion process is utilized to convert water to steam, such as in a steam generator. In this regard, the inner surfaces of the walls 12, 14 and 16 may be appropriately provided with suitable thermal insulation, such as refractory - material liners (not shown).

With continuing reference to Fig. 1, the perforated air distribution plate 20 includes a plurality of air distributors, or nozzles, 28 extending through a plurality of spaced openings formed through the plate 20. The nozzles 28 are in the form of vertically disposed tubular members that extend upwardly from the plate 20 for a predetermined distance into the bed 18 of particulate material. The nozzles 28 are spaced apart in the direction from front-to rear as shown in Fig. 1, it being understood that they are also spaced apart a predetermined distance from side-to-side so as to span the entire area enclosed by the walls 12, 14 and 16 and the sidewall that is not shown.

The lower end of each nozzle 28, as viewed in Fig. 1, projects below the lower surface of the plate 20 and communicates with the air plenum chamber 22. The upper end of each nozzle 28, as viewed in Fig. 1, may include a discharge arm 30 disposed at an acute angle to the vertically extending body portion 32 of the nozzle 28.

Figure 2:
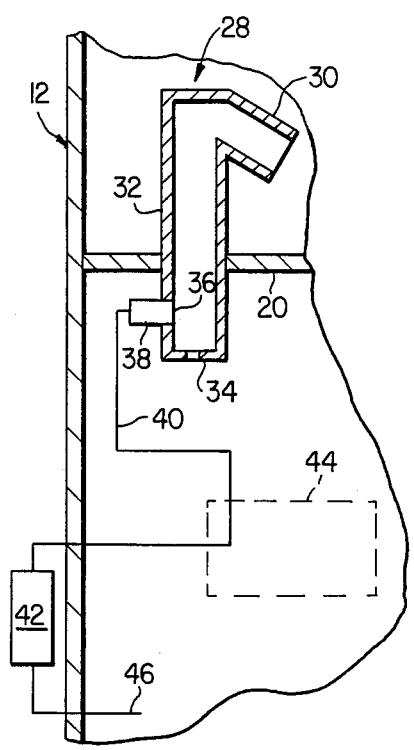
FIG. 2 is an enlarged partial sectional view of a portion of the air distribution plate and a nozzle utilized in the fluidized bed reactor of Fig. 1.

Fig. 2 shows a first embodiment of a nozzle 28 adapted for measurement of the static pressure therein for determining the rate of air flow into the bed 18 of particulate material according to the present invention. According to this embodiment, the nozzle 28 includes an orifice plate 34 located at the inlet to the vertically extending body portion 32 of the nozzle 28. When air from the plenum 22 enters the nozzle 28, a flow profile is generated that varies with the downstream distance from the orifice plate 34.

A hole 36 is tapped into the body portion 32 of the nozzle 28 downstream of the orifice plate 34 and a pressure sensing device 38 is inserted into the hole 36. A sensing line 40 is attached to the sensing device 38, and is directly routed to a differential pressure transmitter 42 or through an optional snubber-capacitor 44 as will be described. The differential pressure transmitter 42 is attached to a sensing line 46 which senses the pressure in the air plenum 22 in a conventional manner.

The hole 36, preferably, is tapped at the location of the vena contracta which is the point at which the flow profile generated by the orifice plate 34 contracts to a minimum in accordance with conventional fluid flow principles. In addition, the hole 36 is tapped downstream of the orifice plate 34 to avoid plugging of the pressure sensing device 38 caused by an accumulation of dust or very fine bed particles on the orifice plate 34 that enter the nozzle 28 by backflow when the reactor is shut down. Plugging of the pressure sensing device 38 can also be avoided by the addition of a filter (not shown) on the pressure sensing device 38 or by locating the device at a location further downstream from the orifice plate 34.

Figure 3:
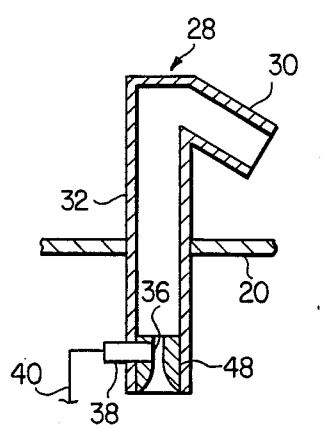
Fig. 3 is a view similar to Fig. 2, but depicting an alternate embodiment of a nozzle utilized in the fluidized bed reactor of Fig. 1.

Preferably, the static pressure is measured in a plurality of nozzles 28 to minimize sampling errors and to provide a statistically significant rate of air flow into and throughout the entire range of the bed 18 of particulate material. Nozzle-to nozzle flow differences are minimized by locating identical orifice plates 34 at the inlet of each nozzle 28. When pressure is measured in a plurality of nozzles 28 a sensing line 40 from each of the plurality of nozzles 28 may be routed through the optional snubber-capacitor 44. The snubber-capacitor 44 averages the pressure reading from the plurality of nozzles 28 and its volume is recommended to be at least three times the volume of all the sensing lines 40. It is also feasible to measure each differential pressure of the multiple instrumented nozzles and to average the readings within the control or monitoring system. It is also feasible to monitor and display individual nozzles to provide an indication of air flow distribution across the grid plate. Fig. 3 illustrates a second embodiment of the present invention which includes components identical to some components of the previous embodiment which components are given the same reference numerals. In the embodiment shown in Fig. 3 a venturi block 48 is located within the vertically extending body portion 32 of the nozzle 28. The venturi block 48, preferably, is a solid piece of metal having a bell mouth inlet so that instead of generating a flow profile with a vena contracta, a consistent velocity is generated throughout the throat of the venturi block 48. A hole 36 is tapped into the body portion 32 of the nozzle 28 at any point within the throat of the venturi block 48.

The pressure sensing device 38 is inserted into the hole 36 and, since there is a consistent velocity throughout the throat of the venturi block 48, the device 38 can obtain uniform and repeatable pressure measurements. In addition, the sensing hole 36 is tapped downstream of the bell mouth but along the extension of the throat of the venturi block 48 so that there is no shelf upstream of the sensing hole 36 upon which particles can accumulate and block the pressure sensing device 38. Finally, the venturi block 48 provides excellent mechanical strength for the sensing device 38.

The pressure sensing device 38 is connected to the sensing line 40 in a similar manner as described above in reference to Fig. 2. As in the latter arrangement, the sensing line 40 may be directly routed to a differential pressure transmitter or, preferably, pressure is measured in a plurality of nozzles and a sensing line from each nozzle is routed to a snubber-capacitor, which communicates with a differential pressure transmitter.

Figure 4:
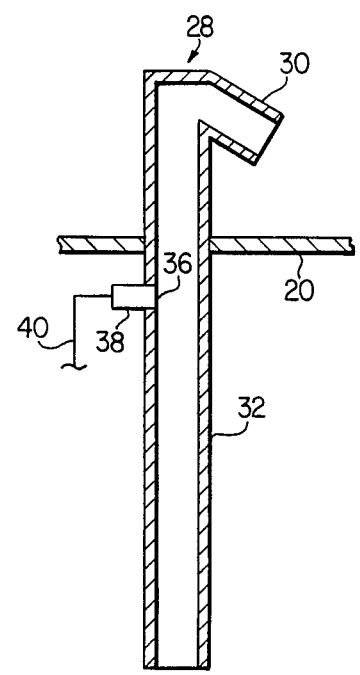
Fig. 4 is also a view similar to Fig. 2, but depicting an alternate embodiment of a nozzle utilized in the fluidized bed reactor of Fig. 1.

Fig. 4 illustrates a third embodiment of the present invention in which the nozzle 28 does not include an orifice plate. In this embodiment, the hole 36 is tapped into the body portion 32 of the nozzle 28 at a point that is preferably at least five times the diameter of the nozzle body downstream of the nozzle inlet. In this manner, inconsistent flow measurements are minimized, since the turbulence created by entrance effects at the inlet of the nozzle have dissipated and uniform flow has developed thus yielding consistent readings from nozzle to nozzle.

The pressure sensing device 38 is inserted into the hole 36 and is connected in the same manner as described above in reference to Figs. 2 and 3.

In operation, the air flow regulators associated with the air inlet 26 are opened and air is distributed up through the air plenum chamber 22, toward the perforated air distribution plate 20 and into the inlet ends of the nozzles 28 The air then flows upwardly through the vertically extending body portions 32 of the nozzles 28 before it discharges from their discharge arm 30 into the bed 18 of particulate material. The air discharges into the bed 18 in a direction generally toward the air distribution plate 20 to fluidize the particulate material and to prevent the formation of a dormant layer of particulate material between the surface of the air distribution plate 20 and the uppermost portion of the nozzles 28.

The bed particulate material provided on air distribution plate 20 is fired while air is introduced into the air plenum chamber 22. Additional fuel and/or sorbent material is introduced by conventional means (not shown) and the fuel is ignited by burners (not shown) positioned within the bed. As the combustion of the fuel progresses, additional air is introduced into the air plenum chamber 22 in guantities sufficient to achieve substantially complete combustion.

The high-pressure, high velocity, combustion-supporting air introduced through the air distribution plate 20 from the air plenum chamber 22 is at a velocity which causes the bed 18 of particulate material to expand and take on a suspended or fluidized state. In the event the reactor utilizes a circulating fluidized bed the air is introduced at a velocity which is greater than the free fall velocity of the relatively fine particles in the bed and less than the free fall velocity of the relatively coarse particles.

To ensure that the desired temperature and fluidized state of the bed 18 of particulate material are maintained, the rate of air flow into the bed 18 is measured. In each embodiment of the present invention, the rate of air flow into the bed 18 is measured by determining the differential pressure between the static pressure in the air plenum chamber 22 and the static pressure within at least one nozzle 28. Since the air flow within the nozzles 28 is at a high velocity, generally over 100 ft/sec, while the air flow within the plenum 22 is stagnant, or at a very low velocity, there will exist a substantial static pressure difference between these two locations. The rate of air flow into the bed 18 of particulate material is determined from the difference in static pressure by means of conventional fluid mechanics calculations that are well-known to those skilled in the art.

Also in each embodiment of the present invention, pressure is measured, preferably, in a plurality of nozzles 28 to provide a statistically significant average pressure to represent the rate of air flow into and throughout the entire range of the bed 18 of particulate material. In the embodiment of FIG. 2, the pressure is measured, preferably, at the same point in the flow profile generated in each nozzle 28 to ensure that uniform pressure measurements are obtained.

In each embodiment of the present invention the pressure in the nozzle 28 is sent to the differential pressure transmitter 42 by means of the pressure sensing device 38 and the sensing line 40. Also, the pressure in the air plenum 22 is sent to the differential pressure transmitter 42 by means of the sensing line 46. The differential pressure transmitter 42 determines the difference in pressure between the air plenum chamber 22 and the nozzle 28. Preferably, in each embodiment, the pressure readings in a plurality of nozzles 28 are sent to the snubber capacitor 44 and are averaged in the snubber capacitor 44. In addition to averaging the pressure readings, the snubber 44 dampens pressure oscillations, transients and fluctuations caused by unsteady air flow through the nozzles 28. The average dampened pressure is sent to the differential pressure transmitter 42 which reads the difference in pressure between the air plenum chamber 22 and the snubber capacitor 44.

It is thus seen that the fluidized bed reactor of the present invention in which the rate of air flow to the bed is measured provides several advantages. For example, by placing a sensing device within the body portion of a nozzle, the need for bulky ducting associated with a duct venturi and the need for an expensive hot wire anenometer or a honeycomb venturi grid are eliminated. Thus, substantial space and equipment cost savings are realized by the fluidized bed reactor of the present invention. Furthermore greater duct design flexibility is available by exclusion of duct venturis, and bed operation at stoichiometric conditions is realizable due to the improved airflow measurement accuracy.

To maximize the accuracy of the pressure readings in each of the above embodiments, the nozzles can be calibrated in a test bed which has a cold sand bed of typical bed height. The dynamic offset to the differential pressure readings due to unsteady flow through the nozzles due to the chug/plug action of bed material above the nozzle, can also be included in a nozzle calibration curve.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the scope of the invention. For example, the fuel supplied to the furnace 24 can be in liquid or gaseous form rather than in the particulate solid form as described. Of course, other variations can be made by those skilled in the art without departing from the invention as defined by the appended claims.

What is claimed is:

1. A fluidized bed reactor comprising means for forming a furnace and a heat recovery section; means in said furnace for supporting a bed of solid particulate material including fuel, air plenum means disposed below said furnace, at least one air distributor for introducing air from said air plenum means into said bed at a velocity sufficient to fluidize said particulate material and support the combustion or gasification of said fuel; first pressure sensing means disposed in said air distributor for sensing the air pressure in said distributor, and second pressure sensing means disposed in said air plenum means for sensing the air pressure in said plenum, whereby the rate of air flow to said bed of particulate material is determined from the difference in the air pressure sensed by said first and second pressure sensing means.

2. A fluidized bed reactor as defined in claim 1, wherein said air distributor has an inlet end and an outlet end, wherein an orifice plate is disposed at said inlet end and wherein said first pressure sensing means is located downstream of said orifice plate.

3. A fluidized bed reactor as defined in claim 2, wherein said orifice plate generates streamlines within said air distributor and wherein said first pressure sensing means is located at the point of greatest contraction of said streamlines.

4. A fluidized bed reactor as defined in claim 1, wherein said air distributor has an inlet end and an outlet end, wherein a venturi block is disposed at said inlet end and wherein said first pressure sensing means is located within said venturi block.

5. A fluidized bed reactor as defined in claim 4, wherein said venturi block has a bell-mouth inlet.

6. A fluidized bed reactor as defined in claim 1, wherein said air distributor has an inlet end and an outlet end, and wherein said first pressure sensing means is located at a distance from said inlet end that is at least as great as five times the diameter of said air distributor.

7. A fluidized bed reactor as defined in claim 1, wherein there are a plurality of air distributors and wherein first pressure sensing means is located in at least a portion of said air distributors.

8. A fluidized bed reactor as defined in claim 1, further comprising means cooperating with said first pressure sensing means and said second pressure sensing means for determining air flow to said fluidized bed.

9. An air flow measurement device for measuring the rate of air flow to a fluidized bed reactor having a fluidized bed of particulate material as a source of heat, air plenum means disposed below said fluidized bed, and at least one air distributor for introducing air from said air plenum means into said fluidized bed, said air flow measurement device comprising:

first pressure sensing means disposed in said air distributor for sensing the air pressure in said distributor; and second pressure sensing means disposed in said air plenum means for sensing the air pressure in said plenum, whereby the rate of air flow to said bed of particulate material is determined from the difference in the air pressure sensed by said first and second pressure sensing means.

10. A fluidized bed reactor as defined in claim 9, wherein said air distributor has an inlet end and an outlet end, wherein an orifice plate is disposed at said inlet end and wherein said first pressure sensing means is located downstream of said orifice plate.

11. A fluidized bed reactor as defined in claim 10, wherein said orifice plate generates streamlines within said air distributor and wherein said first pressure sensing means is located at the point of greatest contraction of said streamlines.

12. A fluidized bed reactor as defined in claim 9, wherein said air distributor has an inlet end and an outlet end, wherein a venturi block is disposed at said inlet end and wherein said first pressure sensing means is located within said venturi block.

13. A fluidized bed reactor as defined in claim 12, wherein said venturi block has a bell mouth inlet.

14. A fluidized bed reactor as defined in claim 9, wherein said air distributor has an inlet end and an outlet end, and wherein said first pressure sensing means is located at a distance from said inlet end that is at least as great as five times the diameter of said air distributor.

15. A fluidized bed reactor as defined in claim 9, wherein there are a plurality of air distributors and wherein a first pressure sensing means is located in at least a portion of said air distributors.

16. A fluidized bed reactor as defined in claim 9, further comprising means cooperating with said first pressure sensing means and said second pressure sensing means for determining air flow to said fluidized bed.

* * * * *